E. BENJAMIN.
CUTTER-HEADS FOR PLANING-MACHINES.
No. 173,439. Patented Feb. 15, 1876.
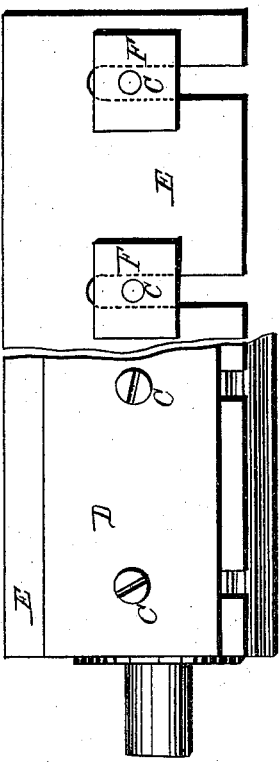
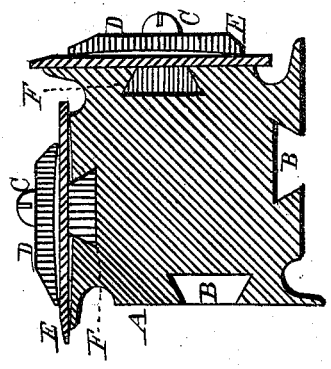

UNITED STATES PATENT OFFICE.

EDWIN BENJAMIN, OF CHICAGO, ILLINOIS.

IMPROVEMENT IN CUTTER-HEADS FOR PLANING-MACHINES.

Specification forming part of Letters Patent No. 173,439, dated February 15, 1876; application filed March 18, 1875.

*To all whom it may concern:*

Be it known that I, EDWIN BENJAMIN, of Chicago, in the county of Cook and State of Illinois, have invented a new and useful Improvement in Cutter-Heads for Planing-Machines, of which the following is a specification:

The object of the present invention is to provide more convenient means for securing knives to cutter-heads used for planing lumber.

The nature of the invention consists in the combination of concave caps with dovetail fastenings for holding the knives to the head.

In the drawings, Figure 1 is a transverse section of my improvement in cutter-heads; Figs. 2 and 3 a broken side elevation thereof.

A represents a cutter-head constructed on the plan of the cutter-head patented by me September 9, 1873, and numbered 142,669. In the four sides of this cutter-head are formed dovetailed grooves B to receive the dovetail nuts F, into which the clamping screws or bolts C are turned. These nuts are independent parts, and when worn can be replaced by new ones, and if the knives be worn out new ones can be used with the old nuts. The knives E are of the same form as those in the patent referred to. The cap-plates D are, however, different, their under sides being concaved out for the purpose of drawing the edges of the knives closely to the cutter-head, and thus preventing vibration.

The head A is made of metal and the cap-plates and knives of steel.

To place the knives E on the cutter-head, put the screws through the cap-plates D and knives E, and turn the nuts F lightly on the screws; then place the nuts in the grooves B by sliding them in at the end of the cutter-head; after which the screws are to be turned tightly on the cap-plates and the device is ready for use, and the nuts cannot get out of place.

I claim and desire to secure by Letters Patent—

The combination of the concave cap-plates D, knives E, cutter-head A, dovetails B, nuts F, and screws C, as set forth.

EDWIN BENJAMIN.

Witnesses:
G. L. CHAPIN,
O. H. ADIX.